(12) United States Patent
Mombourquette et al.

(10) Patent No.: US 11,089,068 B2
(45) Date of Patent: Aug. 10, 2021

(54) ENABLING USER ACCESS TO A CLOUD-BASED APPLICATION

(71) Applicant: Mitel Networks, ULC, Ottawa (CA)

(72) Inventors: Darren Mombourquette, Napean (CA); Ken Armstrong, Woodlawn (CA)

(73) Assignee: Mitel Cloud Services, Inc.

(*) Notice: Subject to any disclaimer, the term of this patent is extended or adjusted under 35 U.S.C. 154(b) by 144 days.

(21) Appl. No.: 16/228,748

(22) Filed: Dec. 20, 2018

(65) Prior Publication Data

US 2019/0215345 A1 Jul. 11, 2019

(30) Foreign Application Priority Data

Dec. 22, 2017 (EP) ..................... 17210222

(51) Int. Cl.
| | |
|---|---|
| *H04L 29/06* | (2006.01) |
| *H04M 3/38* | (2006.01) |
| *G06F 21/62* | (2013.01) |
| *G06F 21/42* | (2013.01) |
| *H04L 29/08* | (2006.01) |
| *H04W 12/06* | (2021.01) |
| *H04M 3/42* | (2006.01) |
| *H04L 12/58* | (2006.01) |

(52) U.S. Cl.
CPC .......... *H04L 65/1073* (2013.01); *G06F 21/42* (2013.01); *G06F 21/6218* (2013.01); *H04L 63/083* (2013.01); *H04L 63/0876* (2013.01); *H04L 63/10* (2013.01); *H04L 65/1056* (2013.01); *H04L 65/1069* (2013.01); *H04L 67/10* (2013.01); *H04M 3/382* (2013.01); *H04L 51/36* (2013.01); *H04L 65/1006* (2013.01); *H04L 67/02* (2013.01); *H04M 3/42059* (2013.01); *H04M 2203/6045* (2013.01); *H04M 2203/6072* (2013.01); *H04M 2203/6081* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 9,813,400 B2* | 11/2017 | Ross | ................... H04L 63/0815 |
| 2016/0094397 A1* | 3/2016 | Barth | ................. H04L 65/1016 |
| | | | 709/203 |
| 2016/0165446 A1 | 6/2016 | Russo | |
| 2016/0286041 A1 | 9/2016 | Forsman et al. | |

FOREIGN PATENT DOCUMENTS

EP 2439970 A1 4/2012

* cited by examiner

*Primary Examiner* — Brandon S Hoffman

(57) ABSTRACT

A method and system is disclosed for registering a user to a cloud-based application, for enabling user access to a cloud-based application. It may comprise receiving a registration request for user access to the cloud-based application, the registration request comprising an identifier associated with a telephone apparatus. The method may further comprise initiating a communication to the telephone apparatus using the identifier, and detecting receipt of the communication at the telephone apparatus to establish a telephony connection. The method may further comprise, subsequent to detecting receipt of the communication to establish a telephony connection, registering the user to the cloud-based application for enabling subsequent access.

18 Claims, 5 Drawing Sheets

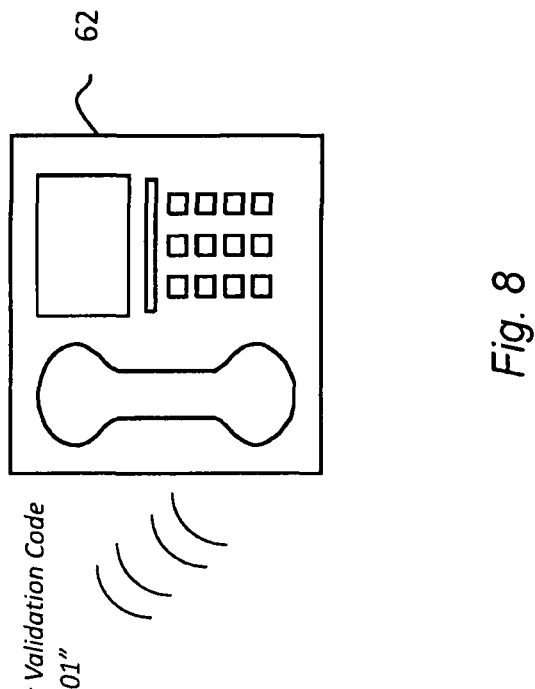
Fig. 8
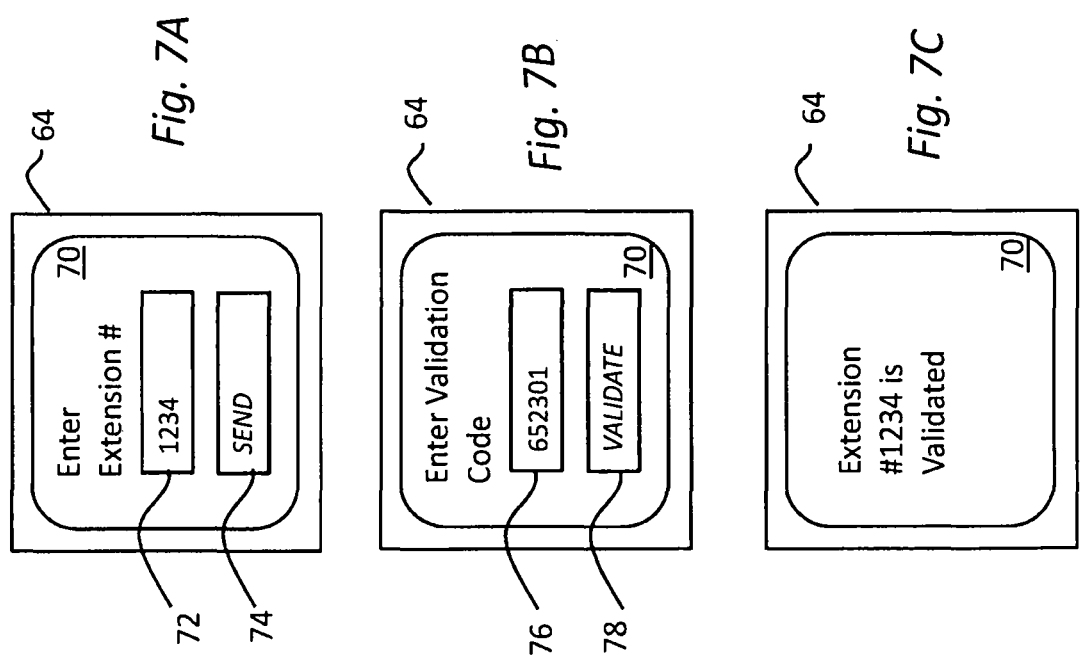
Fig. 7A
Fig. 7B
Fig. 7C

ENABLING USER ACCESS TO A CLOUD-BASED APPLICATION

CROSS REFERENCE TO RELATED APPLICATIONS

This application claims the benefit and priority of European Patent Application No. EP 17210222.0 filed on Dec. 22, 2017, the contents of which are hereby incorporated herein by reference.

FIELD

This invention relates generally to enabling user access to a cloud-based application, for example to register a user to enable subsequent access to the cloud-based application.

DESCRIPTION

It is becoming more common for users to use cloud-based applications (or "apps") relating to communications, for example. Such applications generally involve a registration stage prior to enabling user access. The registration stage may require the user to identify themselves with a username, password and email address; however, to ensure the user exists and is not a spammer or some automated system (e.g. a "bot") an email is usually sent to the user's email address with an activation link which needs to be clicked-on before the user can subsequently access the application using their username and password.

For example, a cloud-based application may relate to a unified communications system (UCS.) A unified communications system is one in which different forms of enterprise communication services are integrated, for example voice, instant messaging, presence information, audio, web and videoconferencing services, voicemail, to name but some. A contact list associated with the enterprise organisation may be provided by the cloud-based platform and may be accessed and edited by means of the related application. One or more cloud-based platforms may be used for this purpose and the related application will communicate with the cloud-based platform. In some cases, a unified communications system may allow an individual to send a message on one medium or service and to receive the same message on another medium or service.

Other cloud-based applications may provide communications services to mobile devices that are normally offered by desk phones, for example integrating cellular calls into the enterprise infrastructure (routed through an enterprise PBX), accessing PBX features such as conferencing and consultation, corporate voicemail etc.

Enterprise organisations may employ a private branch exchange (PBX) which switches calls between enterprise users on local lines whilst allowing users to share a certain number of external phone lines to the exchange. The PBX may be an on-premises PBX, located at the premises of the enterprise organisation. Endpoints, e.g. IP-enabled telephones, need to be configured before use with the PBX. The IP firmware of the endpoint may obtain an IP address and other IP configuration information using requests with a provisioning server.

SUMMARY

An aspect provides a method for enabling user access to a cloud-based application, the method comprising:

receiving from a user a registration request for user access to the cloud-based application, the registration request comprising an identifier associated with a telephone apparatus;

initiating a communication to the telephone apparatus using the identifier;

detecting receipt of the communication at the telephone apparatus to establish a telephony connection; and subsequent to detecting receipt of the communication to establish a telephony connection, registering the user to the cloud-based application for enabling subsequent access.

The method may further comprise causing transmission of a first challenge-response test to the user and initiating the communication to the telephone apparatus only upon receiving a successful response to said test.

The first challenge-response test may be transmitted using a medium other than the medium from which the registration request was received.

Initiating the communication comprises may comprise initiating a voice call and detecting receipt comprises detecting acceptance of the voice call.

Registering the user to the cloud-based application may further comprise permitting user access to one or more trusted applications, services or functions provided by the cloud-based application.

Registering the user to the cloud-based application may comprise enabling communications made via the cloud-based application to be made using the telephone apparatus.

The identifier may be a telephone number.

The telephone number may be an extension number associated with a private branch exchange (PBX), the method further comprising identifying an external telephone number associated with the PBX.

The identifier may be prompted at, and received from, a registration page associated with the cloud-based application, and caused to be presented at a user device.

The method may further comprise, upon detecting receipt of the communication at the telephone apparatus, causing transmission of a second challenge-response test to the telephone apparatus over the telephony connection, and registering the user upon receipt of a successful response to the second test.

Causing transmission of the second challenge-response test may comprise causing transmission of audio, or data convertible to audio, over the telephony connection, the audio comprising verification data, and subsequently receiving user inputted response verification data for comparison with the audio verification data, the user being registered if the verification data agrees.

The method may further comprise, subsequent to detecting receipt of the communication at the telephone apparatus to establish the telephony connection, causing presentation of a verification page associated with the cloud-based application at a user device for receiving the user inputted response verification data.

The verification data may comprise a spoken string of alphanumeric characters.

The method may further comprise upon receipt of a successful response to the second challenge-response test, causing transmission of a third challenge-response test, and registering the user upon receipt of a successful response to the third test.

Causing transmission of the third challenge-response test may comprise transmitting the third challenge in a different form to the second challenge.

The method may further comprise detecting that the telephone apparatus is a video-capable device and wherein the third challenge comprises a visual challenge for display thereat.

The third challenge may be a visual challenge transmitted to a user device other than the telephone apparatus.

The third challenge may comprise prompting user voice input over the telephony connection and performing voice recognition on the received user voice input to determine if it matches expected voice data.

Any of the above challenges may for example comprise queries, cues or questions based on a user's social media activity, for example by asking questions based on messages or multimedia present on a user's social media account.

Another aspect provides a computer program that, when executed by computer apparatus, controls the computer apparatus to perform the method of any preceding method definition.

Another aspect provides an apparatus configured to perform the method of any of preceding method definition.

Another aspect provides a non-transitory computer-readable storage medium having stored thereon computer-readable code, which, when executed by at least one processor, causes the at least one processor to perform a method, comprising:

receiving from a user a registration request for user access to the cloud-based application, the registration request comprising an identifier associated with a telephone apparatus;

initiating a communication to the telephone apparatus using the identifier;

detecting receipt of the communication at the telephone apparatus to establish a telephony connection; and subsequent to detecting receipt of the communication to establish a telephony connection, registering the user to the cloud-based application for enabling subsequent access.

with a plurality of feedback classification levels for classification by the first device.

Another aspect provides an apparatus, the apparatus having at least one processor and at least one memory having computer-readable code stored thereon which when executed controls the at least one processor:

to receive from a user a registration request for user access to the cloud-based application, the registration request comprising an identifier associated with a telephone apparatus;

to initiate a communication to the telephone apparatus using the identifier;

to detect receipt of the communication at the telephone apparatus to establish a telephony connection; and subsequent to detecting receipt of the communication to establish a telephony connection, to register the user to the cloud-based application for enabling subsequent access.

BRIEF DESCRIPTION OF DRAWINGS

Features and advantages of the invention will be apparent from the detailed description which follows, taken in conjunction with the accompanying drawings, which together illustrate, by way of example, features of the invention; and, wherein:

FIGS. 7A-7C are respective graphical user interfaces (GUIs) displayed on an endpoint of the FIG. 6 network, responsive to operation of a module operating according to the FIG. 5 operations according to example embodiments; and FIG. 8 is an IP enabled telephone endpoint, shown during part of the FIG. 5 operations.

DETAILED DESCRIPTION

Reference will now be made to the exemplary embodiments illustrated, and specific language will be used herein to describe the same. It will nevertheless be understood that no limitation of the scope of the invention is thereby intended.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

Figure 1:
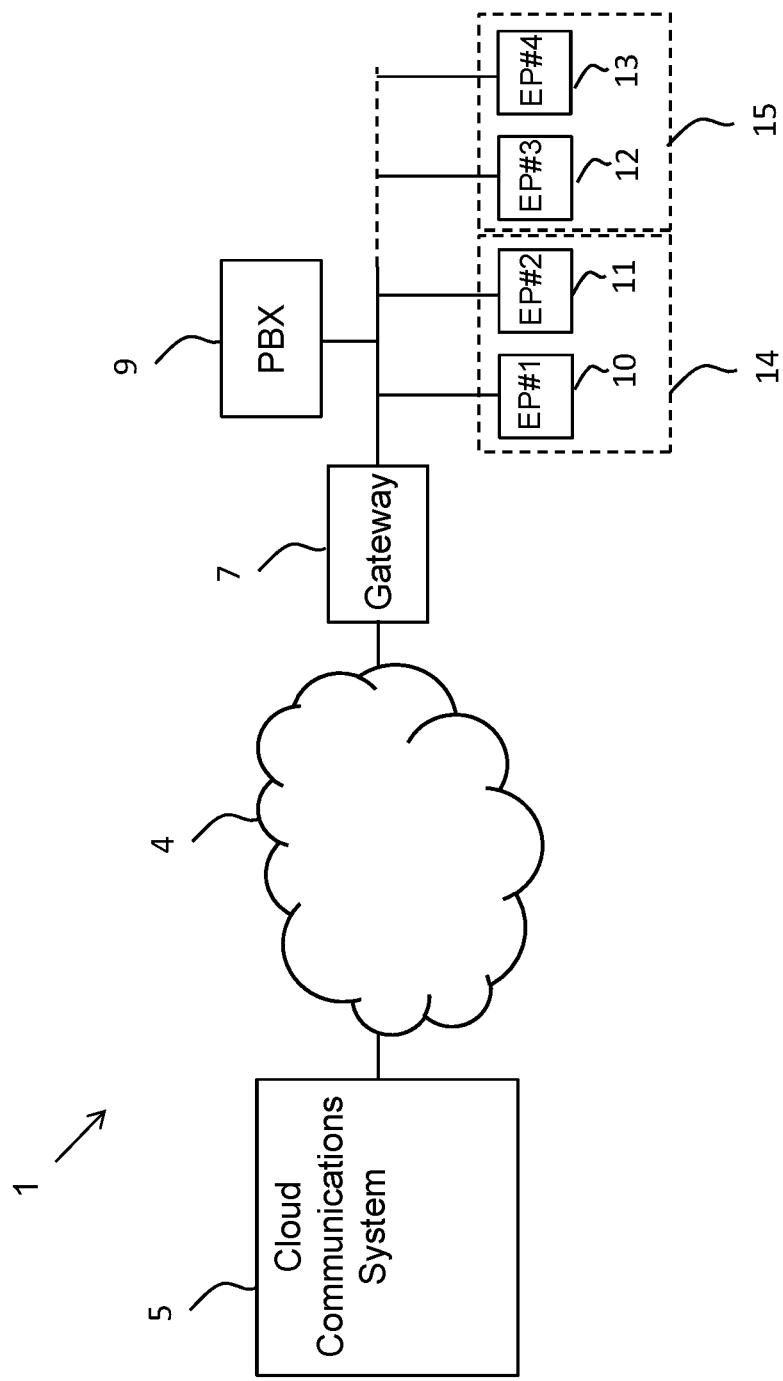
FIG. 1 illustrates a block diagram of a communications network comprising a cloud communications system and a first private network.

FIG. 1 is a schematic representation of a communications network 1. The communications network 1 uses the Internet Protocol (IP) to transmit and receive information via packet switching over the Internet 4. This information may comprise any form of data which represents, for example, voice (e.g. Voice Over IP, or VOIP), video, multimedia, web page data and so on.

A first private network 3 may be connected to the Internet 4 by means of an Internet gateway 7. The first private network 3 may associated with an organisation such as a company or educational establishment. One or more further private networks (not shown) may also be connected to the Internet 4, and may be associated with organisation(s) connected or unconnected with the first private network 3. The first private network 3 comprises, in addition to the gateway 7, a private branch exchange (PBX) 9 and a plurality of endpoints 10-13.

The PBX 9 is a switching system that serves the first private network 3. As will be appreciated, the PBX 9 concentrates a relatively small number of central office lines, or trunk lines, and provides intercommunication between a larger number of private lines within the organisation. Each private line will have an associated extension number, which is set by a local administrator of the first private network 3.

An endpoint 10-13 is an Internet-capable device on the first private network 3. The term can refer to desktop computers, laptops, IP-enabled telephones, IP-enabled teleconference devices, smart phones, tablet computers and printers, to give some examples. The endpoints 10-13 may connect to the first private network 3 by means of a wired or wireless connection. Certain endpoints 10, 12 may be designated PBX-connected endpoints, in that they are assigned an extension number by which the PBX 9 can uniquely identify a particular endpoint to permit other PBX-connected endpoints using the same PBX to initiate voice calls, conference calls and so on.

For example, the PBX-connected endpoints 10, 12 may be IP telephones in respective first and second office or workstation locations 14, 15, capable of VOIP and possibly multimedia communications using, for example, the Session Initiation Protocol (SIP.) One or more of the PBX-connected endpoints 10, 12 may alternatively be conferencing terminals. An administrator of the PBX 9 will generally assign an extension number to the PBX connected endpoints 10, 12, using dedicated confirmation software and/or firmware and may assign additional information such as the name of a respective user which may appear on a display of said endpoint.

Other endpoints 11, 13 not connected to the PBX may be, for example, desktop computers, laptops, smart phones or tablet computers. These other endpoints 11, 13 may connect directly to the gateway 7 via a wired or wireless connection. In the shown example, we assume that said endpoints 11, 13 comprise desktop computers.

A cloud communications system 5 is also shown connected to the Internet 4.

The cloud communications system 5 may provide a platform and associated services and applications for remote users, for example users of the first private network 3 and other networks connected to the Internet 4. This may enable said remote users to utilise communications services without needing dedicated infrastructure at their own location. For example, the cloud communications system 5 may be a unified communications system (UCS) platform. A UCS is one in which different forms of enterprise communication services are integrated, for example voice, instant messaging, presence information, audio, web and videoconferencing services, voicemail, to name but some. A contact list associated with the enterprise organisation may be provided by the cloud-based platform and may be accessed and edited by means of the related application. One or more cloud-based platforms may be used for this purpose and the related application will communicate with the cloud-based platform. In some cases, a unified communications system may allow an individual to send a message on one medium or service and to receive the same message on another medium or service. Other cloud-based applications may provide communications services to mobile devices that are normally offered by desk phones, for example integrating cellular calls into the enterprise infrastructure (routed through the enterprise PBX), accessing PBX features such as conferencing and consultation, corporate voicemail etc.

The cloud communications system 5 may provide a UCS platform by which users of endpoints 10-13 may utilise the cloud-based services and applications. However, in order for the users to interact with the cloud communications system 5, said users need to be registered with the cloud communications system.

In this sense, registration means that the cloud communications system 5 has verified that the user exists, and follows a registration request made by the user, usually prompted by them entering a username and password in a registration page. Once registered, a user can use the services offered by the cloud communications system 5, for example to indicate presence (e.g. whether or not the user's endpoint is busy or available) or to enable VOIP calls with other users of the cloud communications system 5 via its platform.

In embodiments herein, rather than requiring the cloud communications system 5 to manually register end-users, the end-user in the first private network 3 initiates the registration which subsequently happens in accordance with operations to be described below.

The cloud communications system 5 may typically be a server, a plurality of servers, a computer, or a plurality of computers, arranged to provide a centralised platform by which respective users of said endpoints 10-13 may communicate using one or more communications functions, such as voice, instant messaging, presence information, audio, web and videoconferencing services, to name but some.

Figure 2:
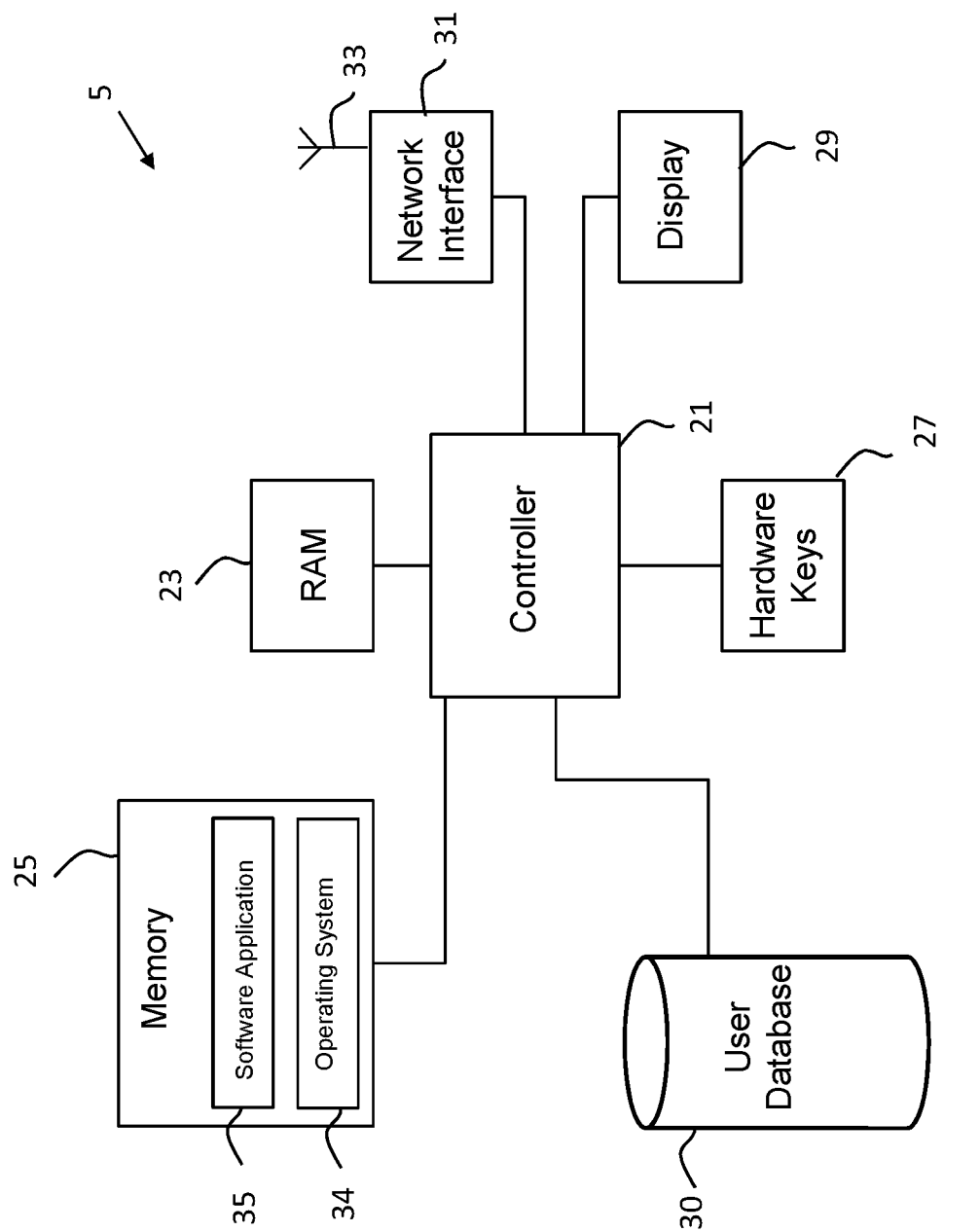
FIG. 2 is a block diagram of components of the cloud communications system.

Referring to FIG. 2, components of the cloud communications system 5 are shown. The cloud communications system 5 may comprise a controller 21, RAM 23, a memory 25, and, optionally, hardware keys 27 and a display 29. The cloud communications system 5 may comprise a network interface 31, which may be a data port for connecting the system to the Internet 4.

The network interface 31 may additionally or alternatively comprise a radiofrequency wireless interface for transmitting and/or receiving data using a wireless communications protocol, e.g. WiFi. An antenna 33 may be provided for this purpose.

A user database 30 for storing data associated with one or more registered users or their associated endpoints 10-13 may also be provided and connected to the controller 21.

The memory 25 may be a non-volatile memory such as read only memory (ROM), a hard disk drive (HDD) or a solid state drive (SSD). The memory 25 stores, amongst other things, an operating system 34 and may store software applications 35. The RAM 23 is used by the controller 21 for the temporary storage of data. The operating system 34 may contain code which, when executed by the controller 21 in conjunction with the RAM 23, controls operation of each of the hardware components of the cloud communications system 5.

The controller 21 may take any suitable form. For instance, it may be a microcontroller, plural microcontrollers, a processor, or plural processors.

In some embodiments, the cloud communications system 5 may also be associated with external software applications not stored on the cloud communications system 5. These may be applications stored on a remote server device and may run partly or exclusively on the remote server device. These applications may be termed cloud-hosted applications.

The software application 35 may provide a cloud communications system platform, namely one or more software functions for enabling communications in accordance with methods to be explained below. We will assume that the cloud communications system platform is a UCS platform as mentioned above, and hence will refer to the software application 35 as a UCS application 35.

Figure 3:
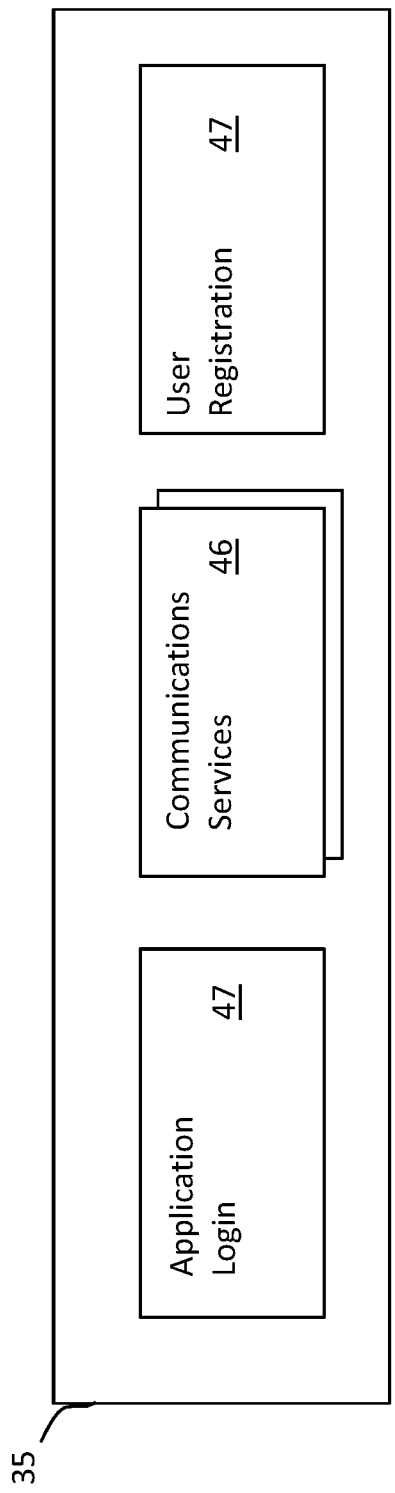
FIG. 3 is a schematic block diagram of components of a software application of the cloud communications system, according to example embodiments.

Referring to FIG. 3, the UCS application 35 may comprise a web-based application which can be remotely by accessed by users by means of a URL entered into a web browser on a suitable computer terminal. For example, in the FIG. 1 embodiment, a first user may access the UCS application 35 using the first desktop computer 11.

Referring to FIG. 3, the UCS application 35 may comprise a number of functional modules, including (but not limited to) an application login module 47, one or more communications services modules 46 and a user registration module 47. The application login module 47 is a conventional authentication module by which a user may login by means of a username and password. The one or more communications services modules 46 comprise services such as, but not limited to, voice, instant messaging, presence information, audio, web and videoconferencing services, voicemail, to name but some. The user registration module 47 is employed if a new user wishes to use the UCS application 35, and is configured to verify the user and, if verification succeeds, register the user with the UCS application 35 and its constituent communications services 46.

Figure 4:
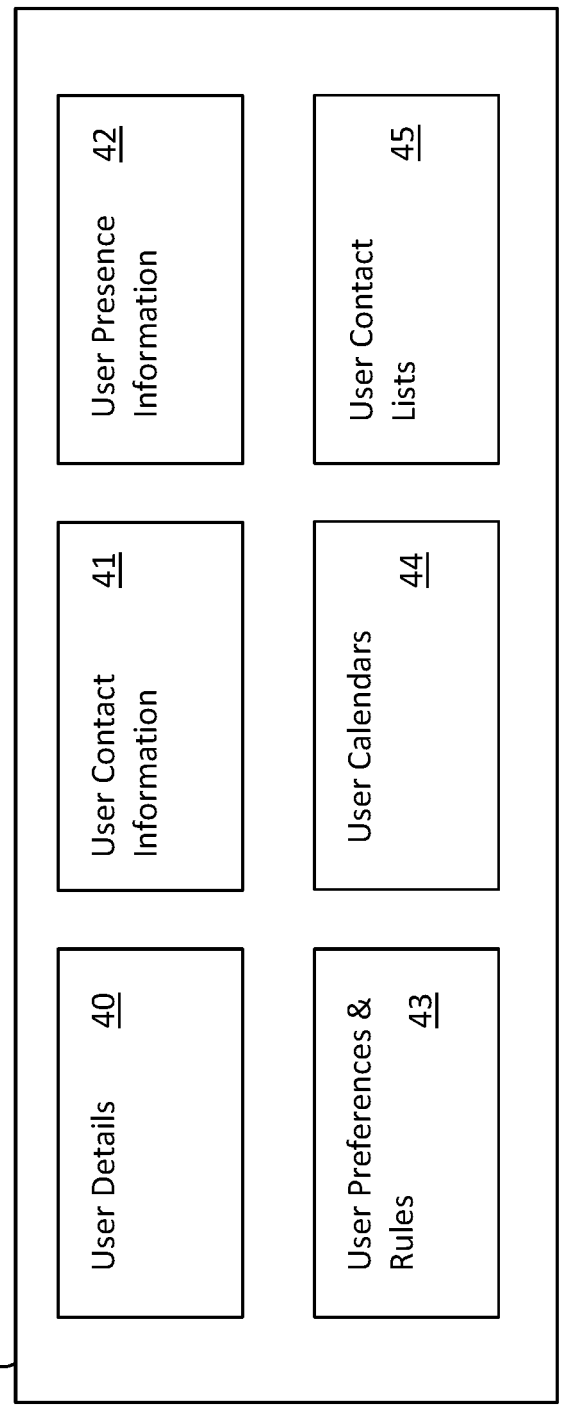
FIG. 4 is a schematic block diagram of components of a database of the cloud communication system according to example embodiments.

Referring to FIG. 4, the user database 30 is configured to store and update a plurality of data modules 40-45. A first data module 40 stores user details for users registered with the UCS application 35. For example, the first data module 40 may store, for each user, a user ID and user name. A second data module 41 stores user contact data, for example telephone number(s) (landline, mobile, work), email address, website, address etc. A third data module 42 stores user presence information reflecting the user's status, for example "available", "busy", "do not disturb", "in a meeting", "on leave", "out of hours" or "sleeping." The user presence information may be updated manually by users or updating may be performed automatically based on time zone data, as will be explained later on. A fourth data module 43 stores user preferences and rules, for example rules determining which communications functions are enabled or inhibited based on the presence or status information. A fifth data module 44 stores calendar information for each user, for example dates and times of meetings, appointments and so on. A sixth data module 45 stores contact lists of other registered users that each respective user has added to their personal list.

Embodiments that follow relate to the user registration module 47 shown in FIG. 3.

Figure 5:
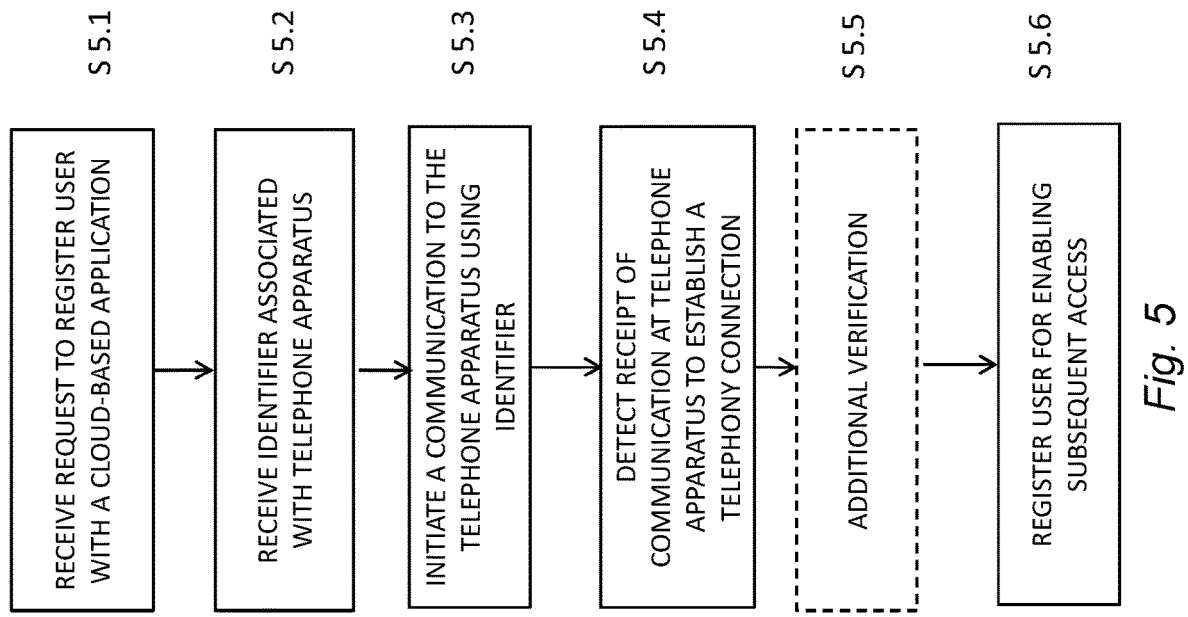
FIG. 5 is a flow diagram showing example processing operations performed by a module of the FIG. 3 software application.

Referring to FIG. 5, a flow diagram showing processing operations performed by the user registration module 47 are shown. Certain operations may be optional and/or re-ordered.

A first operation 5.1 may comprise receiving a request to register a user with a cloud-based application. Another operation 5.2 may comprise receiving an identifier associated with the telephone apparatus. For example, the identifier may be a telephone number of an extension number associated with the first or second PBX-connected endpoints 10, 12.

The first and second operations 5.1, 5.2 may be handled in a single message or as multiple messages. For example, upon requesting registration in a first message, the user registration module 47 may return with a request for the user to enter their telephone identifier.

In some embodiments, in-between the first and second operations 5.1, 5.2, a challenge-response test may be transmitted to the user, for example by sending a verification code or similar and possibly using a medium other than that used to receive the user request. For example, a verification code may be sent by SMS, email or a social media message platform to the user, and the user may be prompted to respond to this test, for example by entering the code (or other response) for verification. In some embodiments, the verification code may be entered at, and received from, any device.

In some embodiments, the verification code may be entered through a cloud-based resource such as Microsoft OneDrive. Only if the response is verified may the subsequent operation 5.3 be performed.

In some embodiments, the challenge-response test may be dependent on, or based on information within, a social media platform, whereby cues, challenges or questions that only the user would know the answer to are generated and presented. For example a challenge-response test would be to ask a question pertaining to a contact in the user's social media account, such as information already available or retrievable by the UCS application 35. For example, the UCS application 35 may ask "what was the first name of the contact who sent you a message at 9.49 pm on Saturday, December 16th?" This information is based on information received from the user's social media utility.

In other embodiments, operation 5.3 may happen without the need for this in-between verification.

In other embodiments, to be described below, one or more challenge-response tests may be transmitted to the user subsequent to operation 5.3.

Other forms of verification and challenge-response test examples are given below.

A further operation 5.3 may comprise initiating a communication to the telephone apparatus using the identifier. The communication may be a voice call, and may be a VOIP call. The communication may be a video or multimedia call, e.g. using SIP.

A further operation 5.4 may comprise detecting receipt of the communication at the endpoint 10, 12 to establish a telephony connection. This may be by means of detecting the user at the relevant PBX-connected endpoint 10, 12 lifting the receiver or performing an equivalent operation.

A further, here optional, operation 5.5 may comprise one or more additional verification operations, as will be described below.

A further operation 5.6 may comprise registering the user for enabling subsequent login and use of the UCS application 35 and its constituent communications services 46. For example, the UCS application 35 may at this point consider the user as 'trusted' and enable the user to access or otherwise use trusted applications, services or other resources. The UCS application 35 may, for example, also register the provided endpoint, i.e. the telephone, for communications using the identifier.

Figure 6:
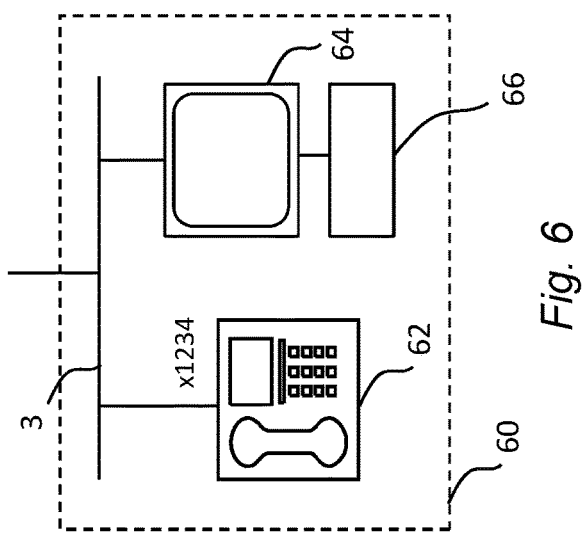
FIG. 6 is a partial block diagram of a private network, including first and second endpoints.

FIG. 6 is a partial view of first and second endpoints 62, 64 which may be connected to the first private network 3 shown in FIG. 1. The first endpoint 62 is a PBX-connected endpoint in the form of an IP telephone. The second endpoint 64 is a desktop computer 64, having an associated keyboard 66. The first and second endpoints 62, 64 are assumed to be located at generally the same location 60 and may be associated with a common user.

FIGS. 7A-7C are schematic views of a graphical user interface (GUI) 70 displayed on the desktop computer 64 by the user registration module 47 of the UCS application 35 when the user at location 60 wishes to invoke registration to the UCS application 35. The GUI 70 may also be presented on the IP telephone 62 or other PBX-connected endpoint if video enabled.

Referring to FIG. 7A, the GUI 70 prompts the user to enter the unique identifier of the IP telephone 62, in this case their extension number which is assumed to be "1234." In other embodiments, other forms of alphanumeric identifier may be prompted for entering. The user enters the string "1234" into an alphanumeric input box 72 and causes transmission of the string to the user registration module 47, either by selecting the send button 74, or alternatively by pressing an enter key or similar.

Upon receipt of the string "1234" at the user registration module 47, the UCS application 35 is configured to initiate a voice call to the extension "1234" with the prefix associated with the PBX 9, so that the call is routed via the PBX 9 and then to the IP telephone 62.

Upon hearing the IP telephone 62 ring its call alert, the user may lift the receiver to accept the call and establish a telephony connection. If the call is not accepted, e.g. within a predetermined number of rings, or is not routed to a valid endpoint, no registration will take place at the endpoint registration module.

In some embodiments, merely accepting the call to establish the telephony connection may be sufficient to cause registration. In other embodiments, further verification is required, as will be explained.

For example, upon lifting the receiver, the user registration module 47 may cause an audio message to play over the accepted voice call, which message contains a computer-generated validation code such as a randomised alphanumeric code. It will be appreciated that this is a form of challenge-response test, in which the audio computer-generated validation code is the challenge and the response is receiving the corresponding code by feedback. For example, as indicated in FIG. 8, the audio message may comprise "enter the validation code 652301" or similar.

Returning to FIG. 7B, the GUI 70 may then display a further screen requesting entry of the validation code contained in the audio message, forming the response to the challenge-response test. The further screen may be transmitted to the desktop computer 64 at substantially the same time the voice call is initiated, or thereabouts.

The user may then enter the validation code into an alphanumeric input box 76, and cause transmission of the validation code to the user registration module 47, either by selecting a validate button 78, or alternatively by pressing an enter key or similar.

The user registration module 47, upon receiving the validation code offered by the user, checks to see if it matches the validation code sent as the challenge in the voice call. If so, the user may be registered at this point, and authorised to subsequently access the UCS application 35. Additionally, the IP telephone 62 may be registered such that the extension number "1234" is registered in association with the user and able to interact with the UCS application 35, e.g. for receiving subsequent calls, messages via the UCS application and/or for enabling cloud-based communications services (e.g. presence information to be updated for viewing by other users of the UCS platform) with the IP telephone. If not, or if no validation code is received, then the user and/or the endpoint is not registered.

In some embodiments, if the IP telephone 62 is enabled for video, the challenge-response test may be sent in visual form, e.g. using the SIP protocol. For example, the challenge may comprise a textual version of the randomised code, which may be presented or converted to speech at a display of the IP telephone 62. For example, the challenge may comprise an image or video clip, with an accompanying questions, such as "how many squares are coloured red?" or "what animal is shown in the image?" for response in the same way mentioned above.

In some embodiments, further challenge-response tests may be employed before registration takes place.

For example, a voice-recognition function may be employed, prompting the user to speak over the telephony connection whereafter the user registration module 47 compares the received audio with a voice signature for the relevant user. This assumes conventional voice recognition software is provided at the UCS platform and that audio signatures of users are captured at the point of users registering with said platform.

In other embodiments, a randomised "captcha" challenge or similar may be issued to the second endpoint 64, and/or to the first endpoint 62 if it is video enabled. The captcha challenge, or similar, may transmit a string of characters in image format for the user to enter as test into an input box for verification at the endpoint registration module 47. Alternative methods such as transmitting a graphical image with an observation-based question may be employed, e.g. how many squares of the image contain letters/the colour red etc.

Another example of a challenge-response test that may be employed in any of the above stages may be to ask a question personal to the user, for example based on information already available or retrievable by the UCS application 35. For example, the test may ask "what was the distance of your last run/walk?" based on information received from that user's health application.

As mentioned above, the challenge-response test may be based on information available from a user's social media account, which the UCS application 35 has access to. The UCS application 35 may generate a question based on information that would only be known to the user, for example based on any message or multimedia item in the user's account.

Any number of additional challenge-response tests may be employed to verify the user. As mentioned previously, in some embodiments, one or more challenge-response tests may be employed before initiating the communication to the telephone apparatus using the identifier.

Any of the challenge-response tests may be transmitted using a different medium to that from which the user request is made, e.g. via SMS, email or social media messaging platform. The response from the user may be received from any device.

Overall, it is to be appreciated that the above embodiments provide a way in which a user can verify themselves to a cloud-based platform for access to functions and services, for example trusted functions and services, by means of providing a telephone number which need not be the telephone number with which they are usually using or associated, i.e. at a different desk than their own. For example, if the cloud-based platform is linked to a car or some other machine or system, the registering process may allow the user to start the car or machine. Other examples include allowing the user to access a computer, register to vote and so on.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for enabling user access to a cloud-based application, the method comprising:

receiving from a user a registration request for user access to the cloud-based application, the registration request comprising an identifier associated with a telephone apparatus;

causing transmission of a first challenge-response test to the user, wherein the first challenge-response test is transmitted using a medium other than the medium from which the registration request was received;

initiating a communication to the telephone apparatus using the identifier upon receiving a successful response to the first challenge-response test;

detecting receipt and acceptance of the communication at the telephone apparatus to establish a telephony connection;

upon detecting receipt of the communication at the telephone apparatus, causing transmission of a second challenge-response test, and registering the user upon receipt of a successful response to the second test, wherein transmission of the second challenge-response test comprises causing transmission of audio, or data convertible to audio, over the telephony connection; and subsequent to detecting receipt and acceptance of the communication to establish a telephony connection, registering the user to the cloud-based application for enabling subsequent access.

2. The method of claim 1, wherein initiating the communication comprises initiating a voice call and detecting receipt comprises detecting acceptance of the voice call.

3. The method of claim 1, wherein registering the user to the cloud-based application further comprises permitting user access to one or more trusted applications, services or functions provided by the cloud-based application.

4. The method of claim 3, wherein registering the user to the cloud-based application comprises enabling communications made via the cloud-based application to be made using the telephone apparatus.

5. The method of claim 1, wherein the identifier is a telephone number.

6. The method of claim 1, wherein the telephone number is an extension number associated with a private branch exchange (PBX), the method further comprising identifying an external telephone number associated with the PBX.

7. The method of claim 1, wherein causing transmission of the second challenge-response test comprises causing transmission of audio, or data convertible to audio, over the telephony connection, the audio comprising verification data, and subsequently receiving user inputted response verification data for comparison with the audio verification data, the user being registered if the verification data agrees.

8. The method of claim 1, further comprising, subsequent to detecting receipt of the communication at the telephone apparatus to establish the telephony connection, causing presentation of a verification page associated with the cloud-based application at a user device for receiving the user inputted response verification data.

9. The method of claim 1, further comprising upon receipt of a successful response to the second challenge-response test, causing transmission of a third challenge-response test, and registering the user upon receipt of a successful response to the third test.

10. The method of claim 9, wherein causing transmission of the third challenge-response test comprises transmitting the third challenge in a different form to the second challenge.

11. The method of claim 1, wherein the audio comprises verification data.

12. The method of claim 11, further comprising subsequently receiving user inputted response verification data for comparison with the audio verification data.

13. The method of claim 12, further comprising the user being registered when the verification data agrees.

14. A computer program that, when executed by computer apparatus, controls the computer apparatus to perform the method of claim 1.

15. An apparatus configured to perform the method of claim 1.

16. A method for enabling user access to a cloud-based application, the method comprising:
receiving from a user a registration request for user access to the cloud-based application, the registration request comprising an identifier associated with a telephone apparatus;
causing transmission of a first challenge-response test to the user, wherein the first challenge-response test is transmitted using a medium other than the medium from which the registration request was received;
initiating a communication to the telephone apparatus using the identifier upon receiving a successful response to the first challenge-response test;
detecting receipt and acceptance of the communication at the telephone apparatus to establish a telephony connection; and
upon detecting receipt of the communication at the telephone apparatus, causing transmission of a second challenge-response test, and registering the user upon receipt of a successful response to the second test;
subsequent to detecting receipt and acceptance of the communication to establish a telephony connection, registering the user to the cloud-based application for enabling subsequent access; and
upon receipt of a successful response to the second challenge-response test, causing transmission of a third challenge-response test, and registering the user upon receipt of a successful response to the third test, wherein the third challenge comprises a visual challenge.

17. A method for enabling user access to a cloud-based application, the method comprising:
receiving from a user a registration request for user access to the cloud-based application, the registration request comprising an identifier associated with a telephone apparatus;
causing transmission of a first challenge-response test to the user, wherein the first challenge-response test is transmitted using a medium other than the medium from which the registration request was received;
initiating a communication to the telephone apparatus using the identifier upon receiving a successful response to the first challenge-response test;
detecting receipt and acceptance of the communication at the telephone apparatus to establish a telephony connection; and
upon detecting receipt of the communication at the telephone apparatus, causing transmission of a second challenge-response test, and registering the user upon receipt of a successful response to the second test;
subsequent to detecting receipt and acceptance of the communication to establish a telephony connection, registering the user to the cloud-based application for enabling subsequent access; and
upon receipt of a successful response to the second challenge-response test, causing transmission of a third challenge-response test, and registering the user upon receipt of a successful response to the third test, wherein the visual challenge is transmitted to a user device other than the telephone apparatus.

18. A method for enabling user access to a cloud-based application, the method comprising:
receiving from a user a registration request for user access to the cloud-based application, the registration request comprising an identifier associated with a telephone apparatus;
causing transmission of a first challenge-response test to the user, wherein the first challenge-response test is transmitted using a medium other than the medium from which the registration request was received;
initiating a communication to the telephone apparatus using the identifier upon receiving a successful response to the first challenge-response test;
detecting receipt and acceptance of the communication at the telephone apparatus to establish a telephony connection; and
upon detecting receipt of the communication at the telephone apparatus, causing transmission of a second challenge-response test, and registering the user upon receipt of a successful response to the second test;
subsequent to detecting receipt and acceptance of the communication to establish a telephony connection, registering the user to the cloud-based application for enabling subsequent access; and
upon receipt of a successful response to the second challenge-response test, causing transmission of a third challenge-response test, and registering the user upon receipt of a successful response to the third test, wherein the third challenge comprises prompting user voice input over the telephony connection and performing voice recognition on the received user voice input to determine if it matches expected voice data.

* * * * *